United States Patent Office 3,052,020
Patented Sept. 4, 1962

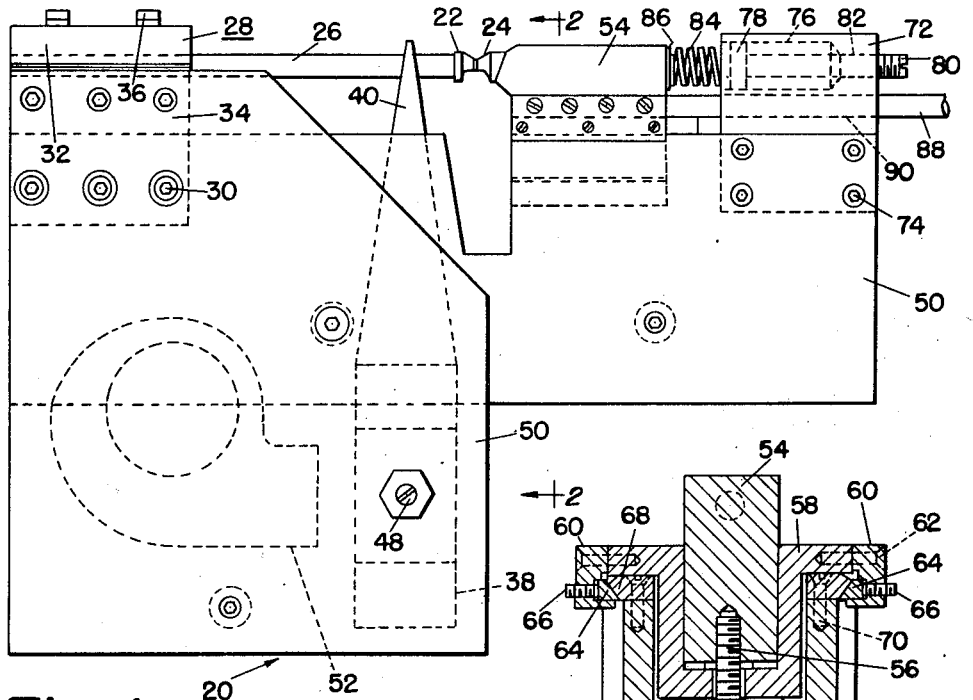
Fig. 1
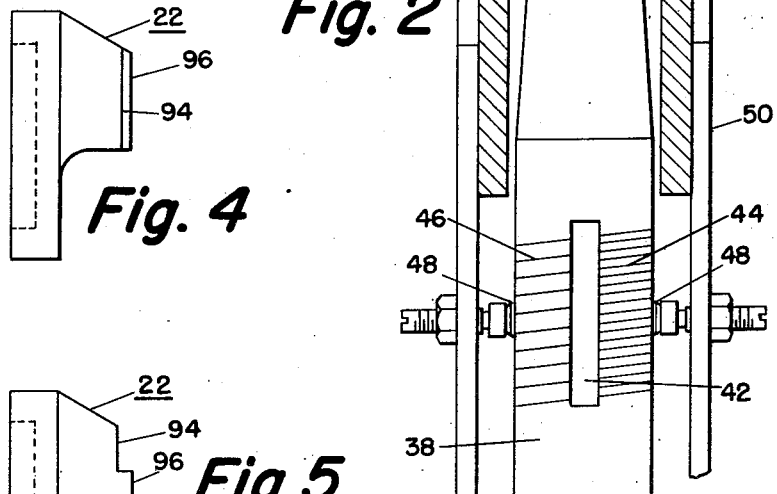
Fig. 2
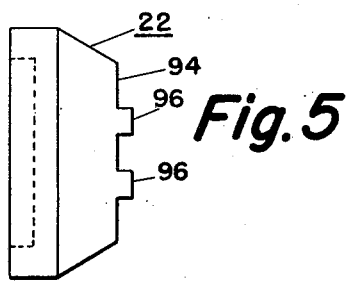
Fig. 4
Fig. 5
INVENTORS
JAMES BYRON JONES
WILLIAM C. ELMORE
CARMINE F. DE PRISCO
BY Arthur H. Seidel
ATTORNEY

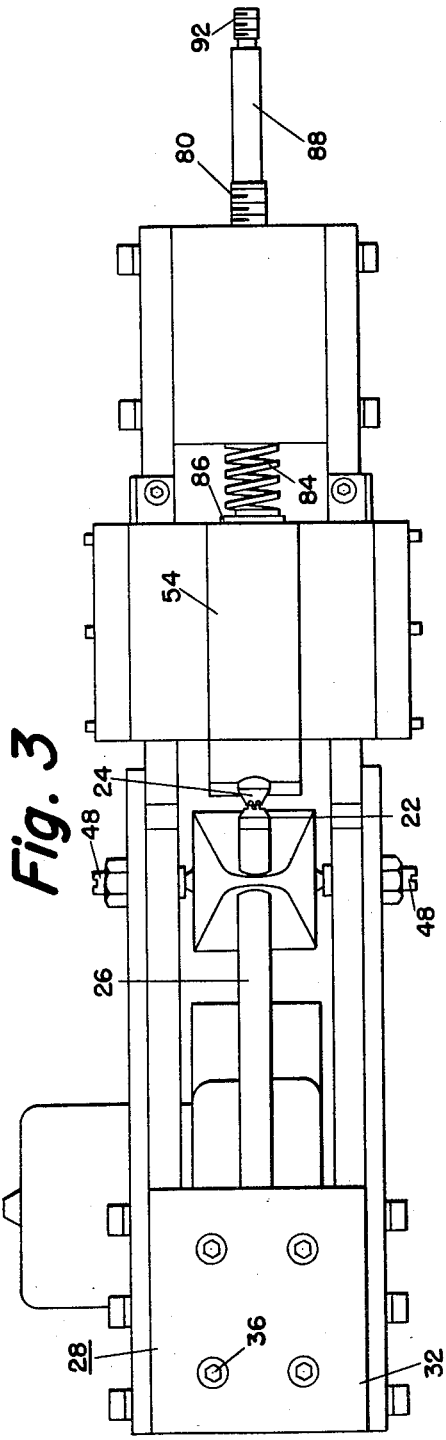
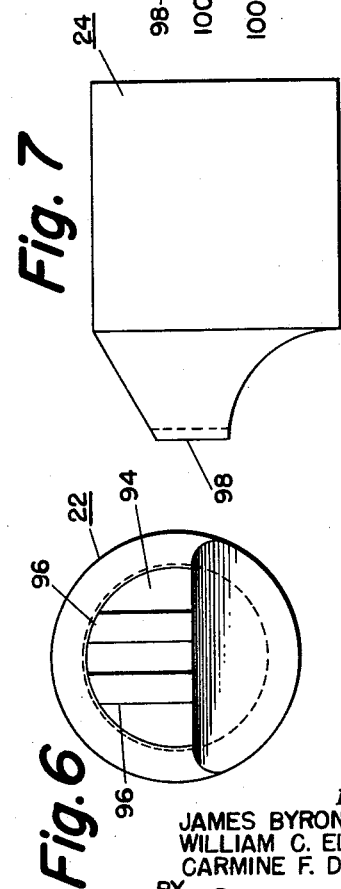
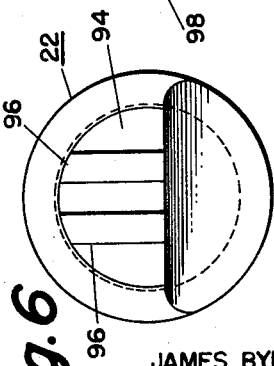

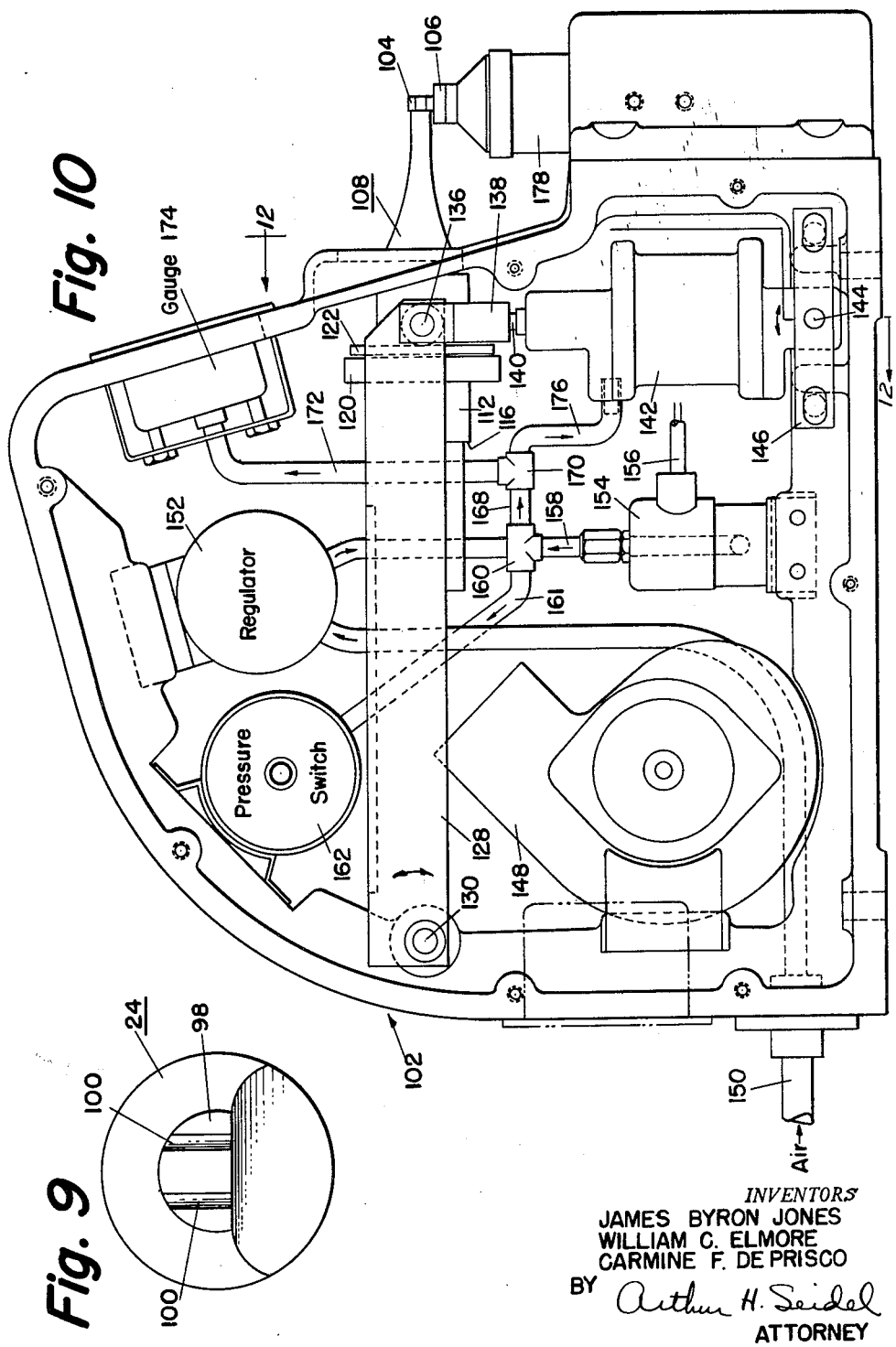

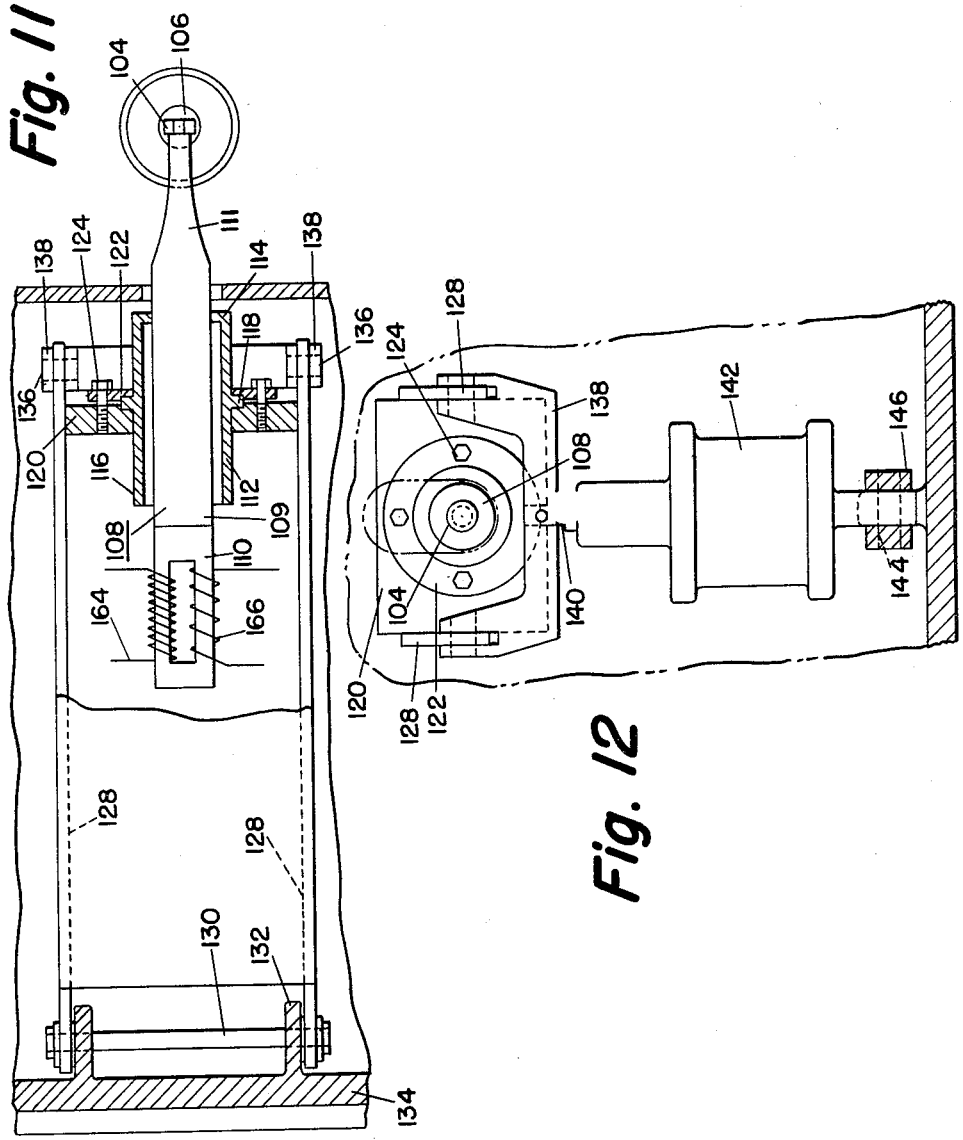

3,052,020
PROCESS FOR WELDING DIMINUTIVE OBJECTS
James Byron Jones, West Chester, William C. Elmore, Media, and Carmine F. De Prisco, West Chester, Pa., assignors, by mesne assignments, to Sonobond Corporation, West Chester, Pa., a corporation of Pennsylvania
Original application June 3, 1958, Ser. No. 739,505. Divided and this application Nov. 29, 1960, Ser. No. 72,408
4 Claims. (Cl. 29—470.1)

The present invention relates to a process for welding diminutive objects. More particularly, the present invention relates to a vibratory process for welding a metal object whose largest cross-sectional dimension is of the order of 0.075 inch to another metal object of the same, smaller, or larger size. In particular, the present invention has prime utility for the welding of fine wires to each other or to other objects, as in the case of igniter assemblies or explosives, filaments for light bulbs, diminutive thermocouples, foils, and articles of jewelry.

Attempts to weld wires or thin foils are often unsatisfactory for a number of reasons. Thus, in many cases the high energy and heating of conventional welding damages the extremely thin metal or the small object. Experience has shown that not only are such weldments frequently unsightly, but that they often require considerable cleaning or dressing before the materials can be plated or otherwise finished. Moreover, contemporary welding methods joining diminutive objects commonly produce a degree of sputter or spatter of melted metal or oxide, which amounts to extruded or exploded material, as well as often giving off gaseous material. In particular, in the case of precision assemblies such as transistors and vacuum-type elements, objects which are to function for very long times without attention especially in high-purity atmospheres, the presence of such impurities leads to early malfunction.

An electrical igniter assembly comprises two electrical conductors mutually connected together esssentially at their ends by a fine filament which, when electric current is introduced, instantly heats to incandescence and disintegrates, said heating and/or disintegrating initiating an explosive train. Experience with production methods for the resistance welding of these objects has demonstrated that frequently the resultant igniter assemblies are of inconsistent quality. In many cases in commercial igniter assemblies, the variations in wire strength and resistance measurements of the assemblies were serious enough to give rise to potential malfunctioning of the device.

In particular, where commercial applications demand the welding together of diminutive metal members which are contoured, difficult problems are encountered with existing welders and processes.

This invention has as an object the provision of a process for vibratorily welding together a plurality of diminutive objects.

This invention has another object the provision of a process for vibratorily welding contoured diminutive objects.

For the purpose of illustrating the invention there is shown in the drawings forms which are presently preferred; it being understood, however, that this invention is not limited to the precise arrangement and instrumentalities shown.

Referring to the drawings wherein like reference characters refer to like parts:

FIGURE 1 is a side elevation of one embodiment of the vibratory welder of the present invention.

FIGURE 2 is a section taken on line 2—2 of FIGURE 1.

FIGURE 3 is a plan view of the embodiment of FIGURE 1.

FIGURE 4 is an elevational view of the welding tip of the embodiment of FIGURE 1.

FIGURE 5 is a view of the welding tip of the embodiment of FIGURE 1 taken from the plan view of FIGURE 3.

FIGURE 6 is a front elevational view of the welding tip of the embodiment of FIGURE 1.

FIGURE 7 is a side elevational view of the reflector tip or anvil of the embodiment of FIGURE 1.

FIGURE 8 is a view of the reflector tip or anvil of the embodiment of FIGURE 1 in the plane of FIGURE 3.

FIGURE 9 is a front elevational view of the reflector or anvil of the embodiment of FIGURE 1.

FIGURE 10 is an elevational view of another embodiment of the present invention with part of the housing cut away to reveal the internal structure of such embodiment.

FIGURE 11 is a plan sectional view from above of the magnetostrictive transducer, sonotrode, mount, and anvil of the embodiment of FIGURE 10.

FIGURE 12 is a view taken on line 12—12 of FIGURE 10.

Referring to the drawings and initially to FIGURES 1 through 9 inclusive, the vibratory welder shown therein is designated generally as 20. The welder 20 includes a stationary fixed welding tip 22 and a reciprocally movable reflector tip or anvil tip 24. As will be more fully explained below, the workpieces to be welded are disposed intermediate the juxtaposed faces of the welding tip 22 and the reflector tip 24.

The welding tip 22 is secured to the sonotrode 26 at the free end thereof. The sonotrode 26 comprises a cylindrical rod which is an acoustical reed of metal and which is supported by the mass member 28 which is fixedly secured in place in the framework as by means of bolts 30. The mass member 28 in this case comprises a pair of contoured blocks 32 and 34 which may be bolted together by means of bolts 36.

The reed-like sonotrode 26 is vibrated in flexure by means of the transducer 38 and the coupling member 40, the latter comprising a tapered or otherwise contoured metallic element brazed, soldered or welded or otherwise secured to transducer 38 and which can encircle and be joined to an intermediate portion of sonotrode 26, being brazed or welded thereto.

Transducer 38 comprises a laminated core of nickel or other magnetostrictive metallic material, and may have a rectangularly-shaped opening 42 in its center portion. A polarizing coil 44 and an excitation coil 46 may be wound through the opening 42 within transducer 38. Upon variations of the magnetic field strength of the excitation coil 46, there will be produced concomitant variations in the dimension of the transducer 38, provided the polarizing coil 44 is charged at a suitable level with D.C. current, and it will be appreciated by those skilled in the art that the frequency of the aforesaid variations, namely the expansion and/or contraction of the magnetostrictive transducer will be equal to the frequency of the alternating electric current flowing in the excitation coil.

Suitable bracing and cushioning posts 48 disposed on either side of transducer 38 and carried by the housing 50 are provided to secure the transducer 38 in position.

In place of the transducer 38 shown in the drawings, other magnetostrictive materials may be utilized such as the alloy 2-V Permendur (an iron-cobalt alloy), a nickel-iron alloy, or Alfenol (an aluminum-iron alloy), properly dimensioned to insure axial resonance with the frequency of the alternating current applied thereto, so as to cause it to decrease or increase in length according to its coefficient or magnetostriction. Transducers of the aforesaid type presently constitute a preferred embodiment for operation at frequencies of up to about 75,000 cycles per second, although they may be used at higher frequencies. As the frequency range within which such metal transducers are presently preferred is the preferred frequency range of this invention, the aforesaid metal magnetostrictive transducers comprise the preferred transducers for the welders of the present invention. However, in place of the aforesaid metallic magnetostrictive materials, the transducer may comprise almost any material which has good physical properties and which changes its physical dimensions under the influence of electrical potential or electric current. Thus, it may comprise a piezoelectric material, such as quartz crystals, or an electrostrictive material such as barium titanate, lead zirconate, etc. Such materials presently are preferably used at high frequency operations, as at frequencies above about 75,000 cycles per second, although they can be used at lower frequencies. The transducer may also consist of ferroelectric materials or an electromagnetic device, such as that which actuates a radio loudspeaker.

The housing 50 also includes a blower 52 for cooling the transducer 38.

The reflector tip 24 is carried on reciprocally movable carriage 54, whose construction is shown particularly in FIGURES 2 and 3.

The carriage 54 is fixedly secured by bolts 56 to the element 58 which has the cross-section of an inverted omega. Runners 60 are secured by bolt means 62 at either side of the inverted omega-shaped element 58.

Each of the runners 60 are provided with pillows or blocks 64 secured by setscrews 66.

The carriage 54 rides on the ways 68, with the pillows 64 slidably engaging juxtaposed surfaces of such ways 68. The ways 68 are secured to the housing 50 by means of bolts 70.

A fixedly secured thrust housing 72 is provided on the opposite end of housing 50 from mass member 28. Thus, the thrust housing 72 may be secured by means of bolts 74 to the housing 50.

The thrust housing 72 is provided with a cylindrical recess 76 within which is reciprocally received the piston 78. The end 80 of the piston rod of piston 78 is threaded and threadably secured within a mating socket 82 in thrust housing 72.

A spring 84 is seated on the free face of the piston 78 and on a spring seat 86 at the rear of carriage 54.

The spring 84 urges the carriage 54 which carries the reflector tip 24 towards the welding tip 22 carried on the fixedly secured sonotrode 26.

A retraction arm 88 is secured to carriage 54, the retraction arm 88 passing through the passageway 90 within thrust housing 72. The threaded end 92 of retraction arm 88 may be secured to suitable retraction means, such as to a hydraulic cylinder's piston, or the like, or retraction arm 88 may be manually operated.

Movement of retraction arm 88 away from mass member 28 withdraws carriage 54 from the welding tip 22.

Adjustment of the position of the piston 78 within the cylindrical recess 76 permits the spring pressure exerted by the spring 84 to be varied to conform to a predetermined value. In order to effect the withdrawal of the carriage 54, the pull to be exercised on the retraction arm 88 must exceed the pressure exerted by the spring 84.

The welding tip 22 and the reflector tip 24 which are shown in the illustrated embodiment of the vibratory welder 20 are intended for the preparation of an igniter assembly in which a wire, as for example a 0.00156-inch-diameter platinum-tungsten wire, is secured to a pair of posts, as for example a pair of 0.025-inch-diameter copper posts. It is to be understood that the specific construction of the welding tip and reflector tip set forth below, while preferred for the production of an igniter assembly of the type heretofore referred to, may be varied depending upon the specific assembly which the user intends to manufacture.

Referring now particularly to FIGURES 4 through 9, there is shown therein a welding tip 22 and a reflector tip 24 having prime utility, as heretofore noted, for the formation of an igniter assembly in which a very fine wire, such as a 0.00156-inch diameter platinum-tungsten wire, is welded onto two posts, specifically being welded to two spaced posts at right angles to the longitudinal axis of each of the posts and on the same side of each of the posts, with suitable posts includnig a 0.025-inch diameter copper post or a 0.025-inch diameter tinned copper posts, or iron posts.

The welding tip 22 (see FIGURES 4 through 6) comprises a sculptured element whose front face comprises the generally flat surface 94 and the pair of spaced forwardly projecting engagement members 96 whose frontmost surfaces are likewise flat.

The reflector tip 24 (see FIGURES 7 through 9) has a flat front surface 98 provided with a pair of spaced semicircular grooves 100, which as particularly shown in FIGURE 3 are disposed when the welding tip 22 and reflector tip 24 are mounted on sonotrode 26 and carriage 54 respectively in juxtaposition to the forwardmost faces of the engagement members 96.

The aforesaid design of the welding tip 22 and the reflector tip 24 permits assemblage of igniter assemblies to be made individually or in the following fashion:

The platinum-tungsten wire may be led by suitable guide means (not shown), such as guide blocks having suitable shims for regulating the height of the platinum-tungsten wire, across the flat surfaces of the engagement members 96 at a suitable height thereon, while the posts may be fed, either in post assemblies in which case intermittent operation is necessary to effect removal of the post assembly and replacement thereof after each weldment, or as continuous strands through the grooves 100. Thus, the posts may be fed through the grooves 100 vertically upwardly. After each weld, accomplished in accordance with the process of our invention described below, the platinum-tungsten wire may be cut permitting the posts to be drawn upwardly. After the posts have been drawn upwardly a predetermined distance, a new weld is accomplished, the platinum-tungsten wire meanwhile having been fed across the faces of the engagement members 96.

Referring now to the embodiment of our invention shown in FIGURES 10 through 12, there is shown therein a vibratory welder 102 having a welding tip 104 and a reflector anvil face 106. The welding tip 104 in this case comprises an octagonally-shaped member, whose lowermost face is provided with engagement members similar to the engagement members 96 of welding tip 22. The reflector anvil face 106 is provided with grooves similar to the grooves 100 of reflector tip 24.

Welding tip 104 is carried on the sonotrode 108 which comprises a cylindrical rod portion metal-to-metal bonded in end-to-end contact with transducer 110. The sonotrode 108 may comprise a cylindrical portion 109 and a tapered portion 111 whose taper may but need not necessarily, satisfy the squation set forth at page 163 of Piezoelectric Crystals and Ultrasonics, by Warren P. Mason, published in 1950 by Van Nostrand Company, namely a curved coupling member whose taper is an exponential function of the length and satisfies the relation:

$$S = S_0 e^{-2Tl}$$

where S equals the original area, $S_0$ equals the reduced area, T equals the taper constant, and $l$ equals the length of tapered section. The total length of the sonotrode 108 should be an integral number of half wavelengths of the transducer's frequency according to the material used, so that the joint between the transducer 110 and the sonotrode 108 will come at a loop of the wave motion and will not be appreciably strained.

The sonotrode 108 and transducer 110 are supported by means of a support mount, which is described in United States patent application Serial No. 517,599, filed June 23, 1955, in the name of William C. Elmore, entitled "Vibratory Device," now abandoned, and in co-pending United States patent application Serial No. 679,041, filed August 19, 1957, in the name of William C. Elmore, now patent 2,891,180, entitled "Support for Vibratory Devices." The support mount comprises a cylindrical metal shell, such as the cylindrical steel shell 112, or a resonant-in-length shell of other suitable material, said shell having a length of at least a single one-half wavelength according to the metal used at the applied frequency. Shell 112 may have a length equal to a multiple number of one-half wavelengths. In the illustrated embodiment shell 112 has a length equal to a single one-half wavelength. Shell 112 surrounds the cylindrical rod portion 109 of sonotrode 108 and is concentric therewith and joined thereto at the shell's end 114 by appropriate means, as by welding, brazing, or soldering. The free end 116 of shell 112 is free from any attachment and, accordingly, when the system is vibrating a true node will develop in the cylindrical shell 112 at the region of the attachment means 118 which is positioned approximately midway (where the shell has a length, as does the subject shell of a single one-half wavelength) of ends 114 and 116, or namely one-quarter wavelength distant from free end 116 of cylindrical shell 112.

The attachment means 118 comprises a radially extending flange or lip fixedly secured intermediate the transverse plate 120 and the retention annulus 122, bolts 124 being utilized to engage the transverse plate 120 and the retention annulus 122. As can be seen from FIGURE 11, the transverse plate 120 and the retention annulus 122 may be rabbeted to provide for aligning securement of attachment means 118.

The transverse plate 120 is carried intermediate a pair of parallel pivot arms 128 which are pivoted about pivot 130 which is suspended intermediate the brackets 132 carried by the housing 134.

The end of each of the pivot arms 128 remote from the pivoted end is secured by pivots 136 to yoke 138.

The yoke 138 is secured to the piston rod 140 of the piston of air cylinder 142.

The air cylinder 142 is pivotably secured by means of pivot 144 intermediate the pivot straps 146 which are carried on the base of housing 134.

A blower 148 is carried on the base of housing 134 for cooling the laminations forming the nickel stack of magnetostrictive transducer 110.

An air conduit 150 for delivering compressed air to welder 102 is provided at the rear of housing 134. The conduit 150 enters housing 134 and passes through air pressure regulator 152 which may be of any suitable construction for regulating the air pressure to a desired level.

From pressure regulator 152 the air conduit 150 extends to the solenoid-operated air valve 154. The solenoid-operated air valve 154 is actuated directly by the user, as by means of a foot switch (not shown) connected to the solenoid-operated air valve 154 through the conduit 156.

The air-discharge conduit 158 from solenoid-operated air valve 154 is bifurcated by means of T 160.

One of the air conduits 161 from T 160 extends to pressure switch 162. The pressure switch 162 may comprise any suitable switch of which there are a number available commercially which closes an electrical circuit responsive to a predetermined air pressure. Pressure switch 162 is appropriately connected into excitation coil 166 of transducer 110 and to the high-frequency alternating current power source which supplies excitation coil 166 of transducer 110 and controls the flow of electrical current to the transducer 110 incident to the achievement of a pre-set air pressure.

The other air conduit 168 from T 160 is bifurcated by T 170 into rigid conduit 172 which is connected to the gauge 174, and to the flexible air conduit 176 which is connected to the air cylinder 142. The use of a flexible conduit 176 permits the air cylinder 142 to be in communication with T 170 notwithstanding the pivotation of the air cylinder 142.

The housing 134 provides a fixed support or base for the reflector anvil 178 which supports the reflector tip 106.

The normal position of the embodiment shown in FIGURES 10 through 12 is with the welding tip 104 urged against the reflector tip 106. The clamping force between the welding tip 104 and the reflector tip 106 is achieved by the downward movement of the piston rod 140 of air cylinder 142.

The air pressure regulator 152 may be set manually to deliver any desired degree of air pressure, permitting the clamping force to be changed at will. The pressure switch 162 may be set so that the transducer 110 is energized only when a predetermined clamping force level, as indicated by the air pressure gauge 174, is reached.

The solenoid valve 154 which controls the flow of air to the pressure switch 162, gauge 174, and air cylinder 142, may be actuated by a foot switch, as heretofore indicated, or alternatively in assembly line units may be actuated by suitable automatic control means.

The process of the present invention in which a diminutive metal object whose largest cross-sectional dimension is of the order of 0.075-inch is welded to the same size, smaller, or larger metal object (by larger metal object is meant to include massive metal objects of considerable or unlimited size) is effected as follows:

The vibratory welding frequency which may be used in the process of the present invention is not critical but may be varied within a very broad range such as 400 to 300,000 cycles per second or more. The optimum operating frequency for diminutive objects according to the process of the present invention lies between about 10,000 and 100,000 cycles per second. This optimum range of operating frequencies may be readily achieved by transducer elements of known design, which are capable of generating vibratory energy of high intensity.

Clamping forces to be used in the process of the present invention should be regulated within the range of two to seventy-five pounds. Preferably, the clamping force should be maintained within the range of twenty to fifty pounds. The minimal clamping force should be a clamping force within the aforesaid range which maintains the metals being welded in regulated alignment and firm contact, e.g. contacting each other so that the weld may be effected by the application of vibratory energy.

Welding in accordance with the present invention should be achieved within the time period of 0.005 to 1.3 seconds, and preferably within the time period of 0.005 to 0.8 second.

The power level for the welding process of the present invention should be maintained within the range of 5 watts to 400 watts, and preferably between 15 and 250 watts.

Welding in accordance with the process of the present invention is in many instances initiated at room temperatures or ambient temperatures without the application of heat.[1] If desired, welding in accordance with the process of the present invention may also be initiated at elevated temperatures below the fusion temperature (melting point or solidus temperature of any of the pieces

---

[1] The weldment may be warm to the touch after the weld due to the application of the vibratory energy.

being bonded).[2] Thus, heating the metals to be welded prior to and/or during welding to a temperature below their fusion temperature may, in some cases, facilitate the ease of welding and lower the power requirements and/or time requisite to achieve welding.

The welding process of the present invention is applicable to the formation of both spot welds and seam welds.

The welding process of our invention may be applied to a wide variety of meals, examples of which include: platinum-tungsten alloy to copper; platinum-tungsten alloy to tinned copper; platinum-tungsten alloy to iron; and many other similar and dissimilar combinations.

The welding of most metals can be effected in accordance with the process of our invention in the ambient atmosphere. However, the process of our invention comprehends welding in highly evacuated atmospheres, or in selected atmospheres, such as atmospheres comprising an inert gas. Furthermore, while the welding process of our invention may be effected with metals, such as aluminum, without the extensive precleaning required to effect satisfactory welding by other methods, a degree of precleaning and surface treatment may prove advantageous in the welding of many metals. It is desirable prior to effecting welding in accordance with the present invention to remove surface contaminants, such as hydrocarbon or other lubricants and the like.

In the following examples in which in each case the welding was commenced at room temperature fair to excellent welds were made using the following post wire materials and bridge wires (the examples are directed to the formation of igniter assemblies) at a frequency of 15,000 cycles per second and under the following conditions:

*Example I*

A platinum-tungsten wire having a diameter of about 0.0015-inch was welded to a bare copper wire having a diameter of about 0.025-inch which had been folded back upon itself with the platinum-tungsten wire disposed between the folded back portions. The clamping force used was between twenty-one and thirty pounds, the weld time was between 0.1 and 1.0 second, and the effective R-F power was between 160 to 200 watts. A fair weld was achieved.

*Example II*

The weld of Example I was repeated except that in place of bare copper wire a tinned 0.025-inch copper wire was substituted and the clamping force was maintained at thirty pounds. A fair weld was achieved.

*Example III*

The weld of Example I was repeated except that in place of the bare copper wire a bare 0.006-inch iron wire was substituted, and the weld time was maintained at 1.3 seconds, the clamping force at thirty pounds, and the effective R-F power at 150 watts. A fair weld was obtained.

*Example IV*

A platinum-tungsten wire having a diameter of about 0.0015-inch was welded across a bare copper post having a diameter of about 0.025-inch using a clamping force of from fifteen to thirty pounds, a weld time of from 0.5 to 1.3 seconds, and an effective R-F power of 100 to 150 watts. Excellent welds were obtained.

*Example V*

The weld of Example IV was repeated except that in

[2] The temperatures to which the foregoing statements refer are those which can be measured by burying diminutive thermocouples (where possible) in the weld zone prior to welding, as well as the temperatures which can be estimated or approximated from a metallographic examination of a cross-section of a vibratory weld in the ordinary magnification range of up to about 500 diameters.

place of the bare copper wire, a tinned copper wire having a diameter of 0.025-inch was substituted. Very good welds were obtained.

*Example VI*

The procedure of Example IV was repeated except that in place of the platinum-tungsten wire a 0.004-inch-thick platinum-tungsten ribbon was substituted, and the weld time was maintained between 1.0 and 1.3 seconds, the clamping force at thirty pounds, and the effective R-F power at 100 to 150 watts. A good weld was obtained.

*Example VII*

The weld of Example IV was repeated except that in place of the bare copper post of 0.025-inch a bare low carbon steel wire having a diameter of 0.25-inch was substituted, and the weld time was maintained between 1.0 and 1.3 seconds, the clamping force at thirty pounds, and the effective R-F power at 150 watts. A good weld was obtained.

*Example VIII*

Several hundred welds were made using an approximately 0.0015-inch platinum-tungsten wire (one percent elongation) or a similar wire (four percent elongation) to determine the optimum welding conditions in terms of producing weld strength consistency. Summarizing the numerous examples, it was determined that the optimum conditions comprise a power level of about 200 to 250 R-F watts, a clamping load of about forty pounds, and an exposure time of between 0.5 to 0.8 second. No differences were noted between specimens involving low-ductility wire or those involving high-ductility wire, and welding to bare copper posts was achieved as readily as to tinned posts.

This application is a division of our copending application Serial No. 739,505, filed on June 3, 1958, for "Vibratory Welder for Diminutive Objects and Process for Welding Diminutive Objects."

The present invention may be embodied in other specific forms without departing from the spirit or essential attributes thereof and, accordingly, reference should be made to the appended claims, rather than to the foregoing specification as indicating the scope of the invention.

We claim:

1. A non-fusion method for welding the metal members together comprising placing a to-be-welded metal member having its largest transverse dimension less than about .075 inch within a recess in an anvil, placing a second metal member in intimate contact with said first mentioned metal member at the intended weld zone, applying a force of between 2 and 75 pounds to the metal members while the metal members are held between said anvil and a rib on a vibrating element, with said rib being juxtaposed and substantially parallel to said recess, applying said force in a direction to hold the contacting to-be-welded surfaces of the metal members in intimate contact at the intended weld zone and to couple mechanical vibratory energy into said zone, and introducing through said vibrating element contacting the second metal member adjacent the weld zone mechanical vibration having a frequency of between about 59 and 300,000 cycles per second, said mechanical vibration comprising a vibration component in a direction substantially perpendicular to the direction of applied force, and with such component being of an energy level sufficient to weld the metal members to each other.

2. A non-fushion method in accordance with claim 1 including reciprocating said anvil in a direction substantially parallel to the longitudinal axis of said vibrating element after said metal members are welded to each other.

3. A non-fusion method as set forth in claim 1 in which the time period for said mechanical vibration is between 0.005 to 0.8 second.

4. A non-fusion method in accordance with claim 1 wherein said second metal member is simultaneously welded to said first member and a third member, with said third member being disposed in a recess on said anvil and said last-mentioned recess being juxtaposed and substantially parallel to a second rib on said vibrating element.

References Cited in the file of this patent

UNITED STATES PATENTS

| | | |
|---|---|---|
| 2,707,823 | Sowter | May 10, 1955 |
| 2,985,954 | Jones et al. | May 30, 1961 |